United States Patent [19]

Ejzak et al.

[11] Patent Number: 5,797,099
[45] Date of Patent: Aug. 18, 1998

[54] ENHANCED WIRELESS COMMUNICATION SYSTEM

[75] Inventors: Richard Paul Ejzak, Wheaton; James Stuart Peterson; Robert Shaw Sellinger, both of Naperville, all of Ill.

[73] Assignee: Lucent Technologies Inc., Murray Hill, N.J.

[21] Appl. No.: 599,571

[22] Filed: Feb. 9, 1996

[51] Int. Cl.[6] .................................................. H04Q 7/20
[52] U.S. Cl. .......................... 455/466; 455/422; 455/466; 370/326; 370/328
[58] Field of Search ......................... 455/422, 466; 370/326, 328, 338, 349, 271, 466, 467, 913

[56] References Cited

U.S. PATENT DOCUMENTS

| | | | |
|---|---|---|---|
| H1641 | 4/1997 | Sharman | 455/466 |
| 5,533,019 | 7/1996 | Jayapalan | 455/466 |
| 5,544,222 | 8/1996 | Robinson et al. | 370/422 |
| 5,574,750 | 11/1996 | Peponides et al. | 455/132 |

*Primary Examiner*—Dwayne D. Bost
*Assistant Examiner*—Jean A. Gelin

[57] ABSTRACT

A wireless cellular voice system and a wireless packet data system cover a common service area consisting of a plurality of cells, and share RF spectrum in providing their respective services to: AMPS phones, CDPD handheld data terminals, and combined AMPS-CDPD subscriber sets. Control of AMPS wireless communication and switching is vested in an AT&T 5ESS™ switch and an AT&T 3B20™ Access Manager. Control of CDPD communication is vested in a Sun SPARC Data Network Processor operating under standard CDPD protocol. A high speed bus of the Access Manager is extended to the SPARC processor to facilitate coordination of use of the shared wireless channels; and to allow the AMPS facility to originate data messages to combined AMPS-CDPD subscriber sets to implement AMPS data features, e.g., VOICE MESSAGE WAITING; ELECTRONIC MAIL NOTIFICATION; PAGING; and CALLER ID (CID); CALLER ID CALL WAITING (CID-CW).

8 Claims, 2 Drawing Sheets

5,797,099

ENHANCED WIRELESS COMMUNICATION SYSTEM

TECHNICAL FIELD

This invention relates to wireless communication systems that provide Personal Communication Services (PCS).

BACKGROUND OF THE INVENTION

Today, independent wireless voice and data base stations share: frequency spectrum; radio frequency facilities; and antennas to serve a common service area which is generally termed a cell. In an illustrative example of a typical installation, an Advanced Mobile Phone System (AMPS) provides Cellular voice phone services; and a Cellular Digital Packet Data (CDPD) system provides wireless data services. An AMPS facility, which comprises: a Mobile Telephone Switching Office, an Access Manager, and base stations, provides wireless control and message connections to Cellular phones; and wired control and message connections to the Public Switched Telephone Network (PSTN). A CDPD system, which comprises: a Data Network Processor (MD-IS) and base stations, provides wireless control and message connections to hand-held portable data terminals; and control and message connections to other nodes on a packet data network. In typical installations, the AMPS voice facilities and the CDPD data system, except for sharing base station facilities and frequency spectrum, are each fully independent of the other. There is neither a control connection nor a message connection between the voice and data systems; and the AMPS facility has absolute priority in the use of RF channels. In order to avoid collision on an RF channel, a CDPD controller in each cell, by means of a "sniffer" of local radio frequency transmissions, maintains surveillance of the RF channels in use by AMPS in its cells; assigns data traffic to channels not presently in use; and abandons transmission on a channel if AMPS transmission is subsequently detected during a data transmission. In times of heavy voice and data traffic, the CDPD system may experience difficulty in assigning the shared RF channels or may collide with AMPS use of a channel. Collision by concurrent use of the same wireless channel by AMPS and CDPD may degrade both voice and data services.

DISCLOSURE OF THE INVENTION

In accordance with one aspect of the present invention, control and message communication is provided between AMPS and CDPD systems which coexist and share RF spectrum in a common service area. Specifically, in accordance with the present invention, a CDPD system is granted high speed bi-directional bus access to memory in the Access Manager 103 of an AMPS system. Additionally, the Access Manager 103 and the Data Network Processor (MD-IS) are each programmed to provide message exchanges between these entities to better coordinate use of channels on the shared RF channels; and to implement a variety of AMPS services.

Advantageously, addition of direct communication, simplifies and improves the assignment of radio frequency channels by the CDPD system; and provides for the introduction of new features in AMPS. Illustrative examples of such new AMPS features include: VOICE MESSAGE WAITING, ELECTRONIC MAIL NOTIFICATION, and SUBSCRIBER PAGING. Additionally, these arrangements provide for alternative implementation of CALLER ID (CID) and CALLER ID CALL WAITING (CID-CW) in AMPS installations.

DETAILED DESCRIPTION

Figure 1:
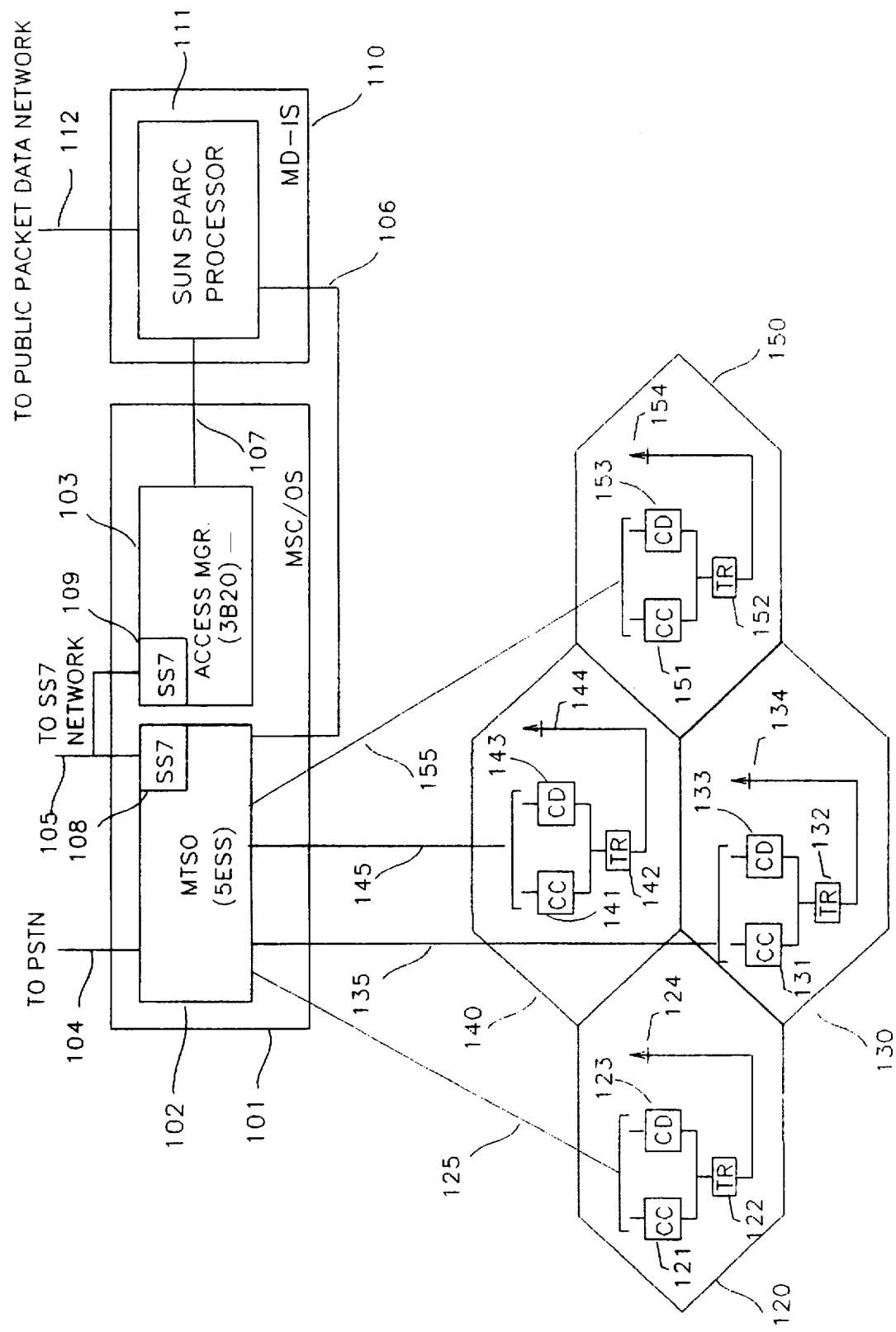
FIG. 1 is a schematic diagram of an illustrative enhanced wireless communication system in accordance with the present invention.

Except for addition of control connection 107 and supporting software and data resident in Access Manager 103 and in Processor 111, FIG. 1 illustrates a prior art installation of AMPS and CDPD facilities which share service areas, cells; and common RF spectrum. In the illustrative example of FIG. 1, connection 107 is an extension of a high speed bus within the AMPS Access Manager 103 to Data Network Processor 111. With access to memory in Access Manager 103, Data Network Processor 111 can directly determine and assign idle RF channels within a cell without delay and without the need to continuously monitor AMPS channel activity through "sniffing" in the cells. Additionally, Access Manager 103 can originate data calls to combined AMPS-CDPD phones. Connection 107 facilitates both enhanced management of the shared spectrum; and AMPS origination of CDPD messages required to implement AMPS features, e.g., VOICE MESSAGE WAITING; ELECTRONIC MAIL NOTIFICATION; PAGING, CALLER ID; and CALLER ID CALL WAITING.

FIG. 1 shows four illustrative cells 120, 130, 140, and 150 that are under control of Mobile Systems Controller/Operations Support (MSC/OS) 101. In a typical installation, an MSC/OS may serve a hundred or more cell sites. In general practice, the available RF spectrum provides 833 RF channels which are allocated among seven related cells. The channels are assigned to the cells in accordance with the expected calling activity in the cells. Such seven cell patterns are repeated to cover a large geographical area. In FIG. 1, the Cellular Controllers (CC), e.g., 121, 131, 141, 151 and the Controllers Data (CD), e.g., 123, 133, 143, 153 respectively maintain current records of AMPS and CPDP communication in their respective cells; and control wireless communication to and from the subscribers in their cell.

Wireless communication to AMPS phones, CDPD stations, and combined AMPS-CDPD stations is via the shared RF Transmit and Receive facilities (TR), e.g., 122, 132, 142, 152 and a shared antenna, e.g., 124, 134, 144, 154 which is tailored to manage cell coverage. The AMPS and CDPD ground facilities in a cell are generally referred to as a "base station".

Mobile System Controller 101 comprises a Mobile Telephone Switching Office (MTSO) 102, and a switch Access Manager 103. In the example of FIG. 1, MTSO 102 is an AT&T number 5ESS™ digital switch, and Access Manager 103 is an AT&T 3B20 ™ processor. SS7 node processors 108 in MTSO 102 and 109 in Access Manager 103 provide communication between MTSO 102 and Access Manager 103 via the SS7 network. Communication between MTSO and other offices of the Public Switched Telephone Network (PSTN), not shown, is via path 104. By way of example, path 104 may be a T1 facility or other transmission facility served by MTSO 102. Communication channels between MTSO 102 and a base station, by way of example, are T1 carrier facilities, e.g., 121, 131, 141, 151. Certain of the T1 facilities 121, 131, 141, 151 are extended to Data Network Processor 111 via T1 carrier facilities 106 and "nailed-up" connections in MTSO 102. The Public Switched Telephone Network (PSTN) comprises: a large number of end switching offices serving local subscriber lines and trunks; a smaller plurality of tandem switching offices for providing connections between end offices; a communication network comprising a large plurality of analog and digital communication paths interconnecting the end offices and tandem offices; optional data bases; and a CCITT SS7 Common Channel Signaling (CCS) overlay signaling network. The SS7 network comprises: a number of interconnected Signal Transfer Points (STP)'s for transmitting and switching data messages among the switching offices; for managing connection and release of paths of the communication network; and for conveying special service requests. For the purpose of identification in the CCS network, the switching offices of the PSTN are assigned discrete "point codes" which identify a node of the signaling network which is assigned to an office. Similarly, communication paths between offices are assigned Circuit Identification Codes (CIC)'s which are used by the offices to establish appropriate connections through their respective communication switching networks. Switching Office translations of Circuit Identification Codes identify both the point of termination of the path on the associated communication switching network and characteristics of the path, e.g., analog or digital.

Calls between subscribers, including AMPS subscribers, are established on the basis of a Public Numbering Plan which requires seven or ten digits to define a called subscriber. A seven digit directory number comprises: a three digit office code and a four digit line identifier. A ten digit directory number comprises an additional three digit Area Code.

COORDINATION OF RF CHANNEL ASSIGNMENTS

In accordance with the present invention, Access Manager 103, without regard for CDPD system activity, assigns wireless channels for AMPS calls that it controls and maintains current channel assignment records in its memory 321. Access Manager 103 has sole control of the channel assignment records 321 in memory 300 to record its seizures and releases of shared RF channels. However, as a departure from the above described practice of the prior art, Data Network Processor 111 has access to the channel assignments records 321 via bi-directional data bus extension 107. Upon receipt of a request for a data transmission to a CDPD data set, Processor 111, via bi-directional path 107, directly accesses the shared channel assignment records in the memory in Access Manager 103 to find, seize, and release channels in its service of data transmissions. Advantageously, with these arrangements, CDPD Processor 111 need only send an order to a Cell Data (CD) controller to serve a transmission with the named channel which has been assigned to the requested transmission. With access to the channel assignment records 321, Processor 111 can readily: detect AMPS seizure of a channel in use by CDPD; find an idle replacement channel; and send an order to the effected CD to use the new channel assignment. This arrangement is in contrast to the prior art in a Cell Data controller CD, e.g., 123 in cell 120, continuously monitors, through "sniffing", channel activity, in its cell to find a channel not in use by AMPS, and assigns requested wireless data transmissions to a channel not in use by AMPS. In the event that AMPS subsequently transmits on a channel in use by the CDPD system, the CD must abandon the data connection, identify an idle RF channel, and complete connections via a newly selected channel. Thus, in the prior art arrangements, when CDPD processor 111 sends a message request to a CD, e.g., 123 in the cell currently serving the intended recipient, the called CD; must, through "sniffing", identify an idle RF channel; assign that channel to the request; and complete the requested transaction.

IMPLEMENTATION OF AMPS FEATURES

Figure 2:
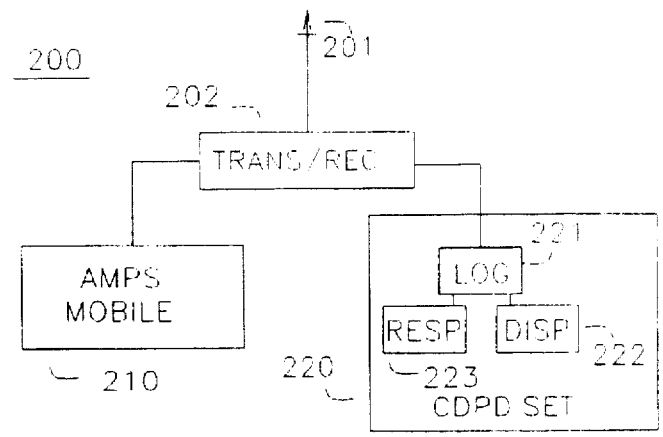
FIG. 2 is schematic diagram of a composite AMPS-CDPD phone.

FIG. 2 is a schematic representation of a combined AMPS/CDPD mobile station set 200 which is capable of executing both voice and data communication; and thus adds bi-directional data services to the voice services presently provided by AMPS. Station set 200 comprises a shared antenna 201; an AMPS transmitter-receiver 210; and a CDPD transmitter-receiver 220, including: logic circuit 221, data display 222 and a data responder 223.

In accordance with the present invention, Access Manager 103 through use of bus extension 107 may establish bi-directional data communication between the MTSO/Access Manager and a combined AMPS/CDPD mobile station. Thus the MTSO/Access Manager, through the CDPD facilities, may advise an AMPS/CDPD mobile of conditions which occur in the voice network. These arrangements provide a two-way channel through which both voice and data can be exchanged between an AMPS/CDPD mobile and the combined MTSO/ACCESS MANAGER/MD-IS.

Examples of conditions representative of new AMPS features include: VOICE MESSAGE WAITING; ELECTRONIC MAIL NOTIFICATION; and PAGING. Access Manager 103 maintains records of both VOICE MESSAGE WAITING and ELECTRONIC MAIL NOTIFICATION in section 322 of memory 300; and records of PAGING in section 323 of memory 300.

Additionally, the same facilities are an alternative arrangement for implementing existing AMPS features, e.g., CALLER ID. CALLER ID records are maintained in memory section 324 by Access Manager 103.

Figure 3:
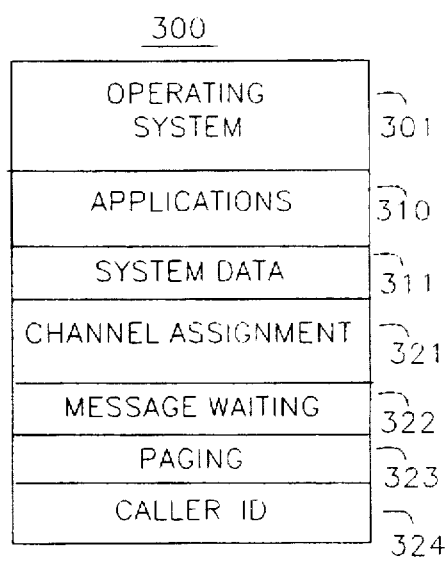
FIG. 3 is a representation of memory assignments in an Access Manager.

As seen in FIG. 3, Memory 300 serves to store its operation system software in section 301; application software, including that required to implement the features of this invention, in section 310; system data in section 311; wireless channel assignment records in section 321; MESSAGE WAITING DATA, both voice and ELECTRONIC MAIL, data in section 322; PAGING data in section 323; CALLER ID data in section 324.

Figure 4:
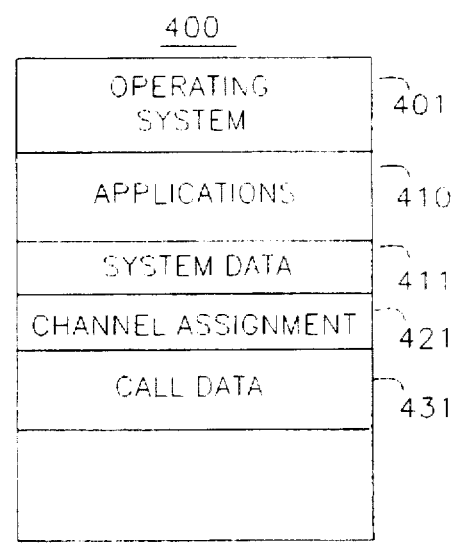
FIG. 4 is a representation of memory assignments in a Data Network Processor.

FIG. 4 illustrates the major software and data items stored in Memory 400 . The operating system, application software, and system data for Data Network Processor are stored respectively in sections 401, 410, and 411. Channel assignment data is stored in section 421, and data for calls in progress is maintained in section 431.

The invention has been described with particular attention to its preferred embodiment; however, it should be understood that variations and modifications within the spirit and scope of the invention may occur to those skilled in the art to which the invention pertains.

What is claimed is:

1. An enhanced wireless communication system comprising:
   a combined AMPS/CDPD facility for controlling one or more wireless base station cell sites comprising: an AMPS Access Manager 103, a CDPD Data Network Processor 111; and communication means 107 for providing bi-directional data communication between said Access Manager and said Data Network Processor.

2. An enhanced wireless communication system comprising a combined AMPS/CDPD facility for controlling one or more wireless base station cell sites comprising: an AMPS Access Manager 103, a CDPD Data Network Processor 111; and communication means 107 for providing bi-directional data communication between said Access Manager and said Data Network Processor;

wherein said Access Manager 103 comprises a memory for maintaining records of AMPS wireless channel assignments in cell sites served by said Access Manager; said CDPD Data Network Processor comprises: means for querying said channel assignment records 321 via said communication means and for assigning and releasing wireless channels for CDPD transmissions in said cell sites.

3. An enhanced wireless communication system in accordance with claim 2 wherein:

said Access Manager 103 comprises a memory 300 for maintaining AMPS data feature activity records 322, 323, 324; and means 301, 310, 311 for originating and sending data transmission requests to said CDPD Data Network Processor 111 for implementing said AMPS data features.

4. An enhanced wireless communication system in accordance with claim 3 wherein:

said AMPS data feature records comprise: MESSAGE WAITING RECORDS 322.

5. An enhanced wireless communication system in accordance with claim 4 wherein:

said MESSAGE WAITING RECORDS comprise: VOICE MESSAGE RECORDS.

6. An enhanced wireless communication system in accordance with claim 4 wherein:

said MESSAGE WAITING RECORDS comprise: ELECTRONIC MAIL RECORDS.

7. An enhanced wireless communication system in accordance with claim 3 wherein:

said AMPS data feature records comprise: CALLER ID RECORDS 324.

8. An enhanced wireless communication system in accordance with claim 3 wherein:

said AMPS data feature records comprise: PAGING RECORDS 323.

* * * * *